Oct. 19, 1948.                C. G. LEMON                2,451,839
                        ELECTRICAL CONDUCTOR
                        Filed May 7, 1945
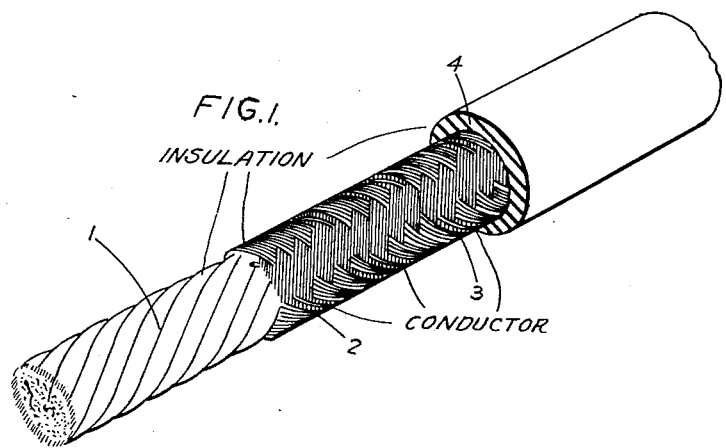
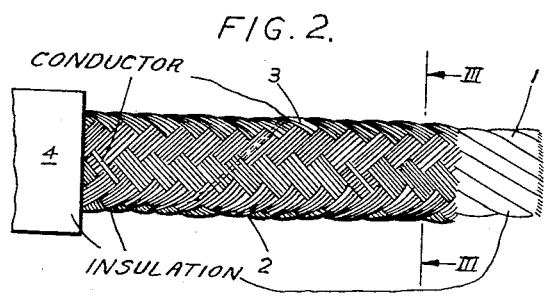 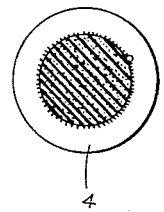
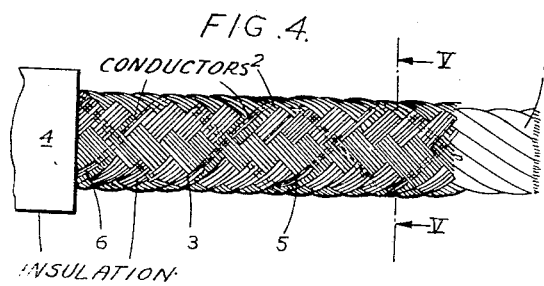 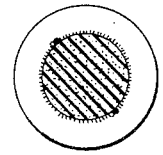
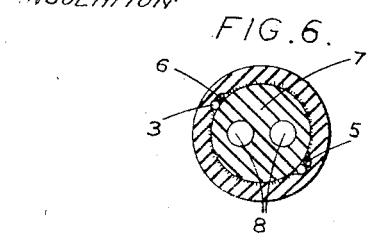
Inventor
CECIL GEORGE LEMON
By
Whittemore Hulbert & Belknap
Attorney Patented Oct. 19, 1948

2,451,839

UNITED STATES PATENT OFFICE 2,451,839

ELECTRICAL CONDUCTOR

Cecil George Lemon, London, England, assignor to Tenaplas Limited, London, England, a British company Application May 7, 1945, Serial No. 592,481
In Great Britain February 15, 1944

Section 1, Public Law 690, August 8, 1946
Patent expires February 15, 1964

14 Claims. (Cl. 219—46)

This invention relates to electrical conductors, by which term it is intended to include electric cables, electric leads, electric resistances and other bodies wherein a metallic wire or other similar electric conductor is employed for the passage of an electric current along a predetermined path.

According to this invention there is provided an electrical conductor unit including a conductor wound to coiled tubular form with adjacent coils or turns in mutually spaced insulated relationship in which condition they are maintained by a woven insulating supporting body through interstices of which the conductor is interlaced.

The term "electrical conductor unit" herein employed is not to be regarded as being limited to a cable or other conductor of any specific length, since an electrical conductor unit according to this invention may, for instance, be made either in the form of an electric cable of considerable length or in the form of a short electrical lead or a heating resistance.

The conductor may be woven into the insulating supporting body and may form one of the strands or filaments thereof. For instance, the supporting body may comprise a tubing or sleeving formed of tubular braid woven from a plurality of silk, cotton, synthetic resin or other suitable flexible insulating strands or filaments braided together in a braiding machine, and the conductor may be woven or incorporated into the braid during its manufacture and may replace one or more of the insulating strands or filaments of the tubular braid material itself.

If desired a plurality of conductors, e. g., two, three or four, all wound to coils of the same diameter may be employed and in this case all the conductors are coiled in the same direction so that the turns of successive conductors, as well as the successive coils of any one of the conductors, lie in mutually spaced relationship.

Where a number of conductors are employed an indicator strand or filament formed of insulating material may be provided for one or each of the conductors and may be woven into the said supporting body or sleeving alongside its conductor. These indicating filaments, if several are employed, would preferably be of different colours and each of a colour different to the said supporting body.

Usually the conductor or conductors would be wound into helical form in which event the pitch of the helix or helices of the conductor or conductors would preferably be the same as that of the insulating strands or filaments of the tubularly braided insulating strands or filaments, so that the conductor or conductors could be readily woven into the tubular braid simultaneously with the latter and at one and the same braiding operation. Thus the insulating strands or filaments of braided material prevent the adjacent coils of the conductor from touching one another.

The woven insulating tubing or sleeving may be arranger, e. g., formed, around a core which would preferably be formed of an insulating material. For example, the core may comprise or consist of a length of cord or string which may be impregnated with a solution of synthetic resin in an organic solvent with which the braid, when formed of a fibrous material, may also be impregnated, or the said core may consist of an extruded length of polyvinyl chloride, polymerised ethylene, rubber or similar material, and where the core material is of a suitable form the core may be of a tubular character, i. e., be provided with one or more longitudinal passageways, so that, for instance, one or more further conductors and/or Bowden wires may be passed therethrough.

If two or more conductors are embodied in the same insulating supporting body these conductors may, if desired, be connected electrically together in series by connecting the appropriate ends thereof.

The conductor or conductors may be formed of metallic wire of any suitable cross-sectional shape and of high, low or intermediate conductivity and each conductor may comprise one or more strands. Thus the conductor or conductors may form resistances for heating or other purposes or may be purely low resistance conductors for connecting together different parts of an electric circuit.

If desired the insulating supporting body and its conductor or conductors may be enclosed in one or more insulating sleevings or coverings. For instance, it may be enclosed in a sleeving of a polyvinyl chloride or polymerised ethylene material.

Electrical conductor units constructed in accordance with this invention are particularly suitable for use in making electric soil heaters, electric blankets and the like.

In order that this invention may be thoroughly understood and readily carried into practice certain embodiments of the same will now be described by way of example with reference to the accompanying drawings, in which:

Figure 1 is a perspective view of a portion of an electrical conductor unit constructed in accordance with this invention;

Figure 2 is a side elevation of the same electrical conductor unit;

Figure 3 is a section on line III—III of Figure 2;

Figure 4 is a side elevation of an alternative form of electrical conductor unit according to this invention;

Figure 5 is a section on line V—V Figure 4;

Figure 6 is a view similar to Figure 5, but shows a modified form of core in the unit;

Figure 7 is a sectional view showing a modified form of the unit illustrated in section in Figure 6.

Referring to the drawings it will be seen that the conductor unit illustrated in Figures 1 to 3 comprises a flexible fibrous core 1 formed by a length of string or like material, and that upon this electrically insulating core is braided a tubular braiding 2 formed from filaments of electrically insulating material such as, for example, silk or cotton. An electrical conductor 3 wound helically with its successive convolutions interlaced in the tubular braid 2 so as to be maintained by this braid in a condition in which its successive convolutions are mutually spaced and electrically insulated from one another.

The preferred method of embodying the electrical conductor 3 in the tubular braid 2 comprises replacing one or more filaments of the insulating braiding by the electrical conductor, the latter being wound upon one of the spools of the braiding machine and the tubular braid and the conductor being braided together at one and the same operation so that the conductor becomes interwoven into the braid in the same way as those insulating filaments which it replaces would have been woven into the braid. In the embodiment of the invention shown in Figures 1 to 3 a single electrical conductor 3 replaces a group of side by side insulating filaments.

The tubular braiding forms an electrically insulating supporting body for the electric conductor and this supporting body and the conductor may be sheathed in an outer covering of electrically insulating material, for instance, polyvinyl chloride or polymerised ethylene. Such an outer sheathing is shown at 4 in Figures 1 to 3. If the electrical conductor 3 is to serve as a heating element, then it is preferred to make the sheathing 4 of a material resistant to heat and very conveniently the sheathing may be formed by extruding the synthetic resin known as alkathene (polymerised ethylene) upon the unit.

Figures 4 and 5 illustrate a modification of the electrical conductor unit shown in Figures 1 to 3, the modification comprising braiding two electrical conductors, namely 3 and 5, into the tubular braiding 2 instead of only one such conductor. It will be seen that these two conductors are mutually insulated and separated by the insulating braiding 2. Both conductors encircle the braided supporting body in the same direction. Figures 4 and 5 also illustrate the use of an indicating filament 6 for each electrical conductor, these indicating filaments being woven with their conductors into the tubular braiding during the formation of the latter, and being of different colours to one another and to the braiding itself so as to serve to indicate the different conductors and facilitate the making of electrical connections thereto.

Figure 6 shows a modification of the arrangement illustrated in Figures 4 and 5 in which the fibrous core 1 is replaced by a non-fibrous flexible core 7 formed preferably of an extruded thermoplastic synthetic resin material such as, for example, polyvinyl chloride or polymerised ethylene; the core may, however, be made of any other suitable flexible insulating material. In this core is arranged at least one longitudinally extending passageway 8. In the example two such passageways are provided side by side and these may serve for housing one or more electrical conductors or, for example, for housing a Bowden wire or like operating device for remotely controlling a switch or other mechanism.

Figure 7 shows an embodiment of the invention similar to that illustrated in Figure 6 with the difference that the core 7 has an electrical conductor 9 centrally embedded therein, the core preferably being extruded on to the conductor.

Advantages accruing from forming a conductor unit as above described are that the successive turns of the conductor or conductors proper are firmly held by the insulating material of the woven supporting body in mutually spaced relationship; that a greater length of the conductor proper may be used per unit length of the conductor unit than is possible if the conductor proper is of purely rectilinear form; the conductor unit may be made so as to be quite flexible, which is not the case with coiled resistance units and the like at present in use; and the unit may be bent with success through quite a sharp angle, since on so bending the unit each turn of the conductor or conductors proper is or are prevented from coming into contact with the next turn by the restraining influence of the helically or otherwise wound insulating material.

What I claim is:

1. A heating unit including at least one electrical conductor of a type adapted to produce heat on a commercial basis wound to a spiral or coiled tubular form on a generally cylindrical core with adjacent coils or turns in mutually spaced insulated relationship, in which condition the coils or turns are maintained by a woven electrically insulating supporting body through interstices of which the conductor is interlaced, the insulating material being of a nature which will not be injured by the heat to be evolved.

2. A heating unit comprising a supporting body formed of filaments of electrically insulated heat resistant material braided together and at least one electrical heating conductor interwoven into said tubular supporting body during the braiding thereof so as to have a plurality of convolutions extending spirally therearound and mutually spaced and electrically insulated by said body.

3. A heating unit including at least one electrical conductor of a type adapted to produce heat on a commercial basis wound to a spiral or coiled tubular form with adjacent coils or turns in mutually spaced insulated relationship, in which condition the coils or turns are maintained by a woven electrically insulating tubular body formed of flexible filaments woven or braided on to a core through interstices of which supporting body the conductor is interlaced, the insulating material being of a nature which will not be injured by the heat to be evolved.

4. A heating unit including at least one electrical conductor of a type adapted to produce heat on a commercial basis wound to a spiral or coiled tubular form with adjacent coils or turns in mutually spaced insulated relationship, in which condition the coils or turns are maintained by a woven electrically insulating tubular body formed of flexible filaments woven or braided on to a core of extrudable material through interstices of which supporting body the conductor is interlaced, the insulating material being of a nature which will not be injured by the heat to be evolved.

5. A heating unit including at least one electrical conductor of a type adapted to produce heat on a commercial basis wound to a spiral or coiled tubular form with adjacent coils or turns in mutually spaced insulated relationship, in which condition the coils or turns are maintained by a woven electrically insulating tubular body formed of flexible filaments woven or braided on to a core of extrudable material having at least one conductor of low resistance extending therethrough through interstices of which supporting body the conductor is interlaced, the insulating material being of a nature which will not be injured by the heat to be evolved.

6. A heating unit including at least one electrical conductor of a type adapted to produce heat on a commercial basis wound to a spiral or coiled tubular form with adjacent coils or turns in mutually spaced insulated relationship, in which condition the coils or turns are maintained by a woven electrically insulating tubular body formed of flexible filaments woven or braided on to a core having at least one passageway therethrough through interstices of which supporting body the conductor is interlaced, the insulating material being of a nature which will not be injured by the heat to be evolved.

7. A heating unit according to claim 1 wherein said supporting body is formed of fibrous heat-resisting material.

8. A heating unit according to claim 1 wherein said core is formed of fibrous heat-resisting material.

9. A heating unit including at least one electrical condutor of a type adapted to produce heat on a commercial basis wound to a spiral or coiled tubular form with adjacent coils or turns in mutually spaced insulated relationship, in which condition the coils or turns are maintained by a woven electrically insulating tubular body formed of flexible filaments woven or braided on to a core through interstices of which supporting body the conductor is interlaced, the insulating material being of a nature which will not be injured by the heat to be evolved, said supporting body and core being impregnated with a solution of a synthetic resin in an organic solvent.

10. A heating unit including at least one electrical conductor of a type adapted to produce heat on a commercial basis wound to a spiral or coiled tubular form with adjacent coils or turns in mutually spaced insulated relationship, in which condition the coils or turns are maintained by a woven electrically insulating tubular body formed of flexible filaments woven or braided onto a core through interstices of which supporting body the conductor is interlaced, the insulating material being of a nature which will not be injured by the heat to be evolved, said supporting body and core being impregnated with a solution of polyvinyl chloride in methylcyclohexanone.

11. A heating unit including at least one electrical conductor of a type adapted to produce heat on a commercial basis wound to a spiral or coiled tubular form with adjacent coils or turns in mutually spaced insulated relationship, in which condition the coils or turns are maintained by a woven electrically insulating supporting body through interstices of which the conductor is interlaced, the insulating material being of a nature which will not be injured by the heat to be evolved, and an outer electrically insulating sheath enclosing said supporting body.

12. A heating unit including at least one electrical conductor of a type adapted to produce heat on a commercial basis wound to a spiral or coiled tubular form with adjacent coils or turns in mutually spaced insulated relationship, in which condition the coils or turns are maintained by a woven electrically insulating supporting body through interstices of which the conductor is interlaced, the insulating material being of a nature which will not be injured by the heat to be evolved, and an outer electrically insulating sheath of polythene extruded upon said supporting body.

13. A heating unit comprising an electrically insulating core formed of fibrous heat resisting material, a tubular covering formed of filaments of electrically insulating and heat resisting material braided around said core, and at least one electrical conductor adapted to produce heat interwoven into said tubular covering during the braiding thereof so as to have a plurality of convolutions extending therearound and mutually spaced and electrically insulated by said body.

14. A heating unit including at least one electrical conductor of the type adapted to produce heat on a commercial basis wound to a spiral or coiled tubular form with adjacent coils or turns in mutually spaced insulated relationship, in which condition the coils or turns are maintained by a woven electrically insulating supporting body through interstices of which the conductor is interlaced, the insulating material being of a nature which will not be injured by the heat to be evolved, and an indicating filament of a color different from that of the said supporting body is braided into the latter beside at least one of the electrical conductors carried by the body.

CECIL GEORGE LEMON.

REFERENCES CITED

The following references are of record in the file of this patent:

UNITED STATES PATENTS

| Number | Name | Date |
| --- | --- | --- |
| 468,585 | Vogler | Feb. 9, 1892 |
| 575,170 | Richards | Jan. 12, 1897 |
| 1,819,612 | Massingham | Aug. 18, 1931 |
| 1,944,390 | Aceves | Jan. 23, 1934 |
| 2,120,301 | Tishman | June 14, 1938 |
| 2,127,122 | Lamela | Aug. 16, 1938 |
| 2,277,177 | Wermine | Mar. 24, 1942 |
| 2,396,099 | Hartwell | Mar. 5, 1946 |

FOREIGN PATENTS

| Number | Country | Date |
| --- | --- | --- |
| 19,807 | British, 1912 | May 19, 1913 |